(12) United States Patent
Dhiman et al.

(10) Patent No.: US 10,397,637 B2
(45) Date of Patent: Aug. 27, 2019

(54) APPARATUS AND METHOD FOR FACILITATING CHANNEL CONTROL ON A PAIRED DEVICE

(71) Applicant: Samsung Electronics Co., Ltd., Suwon-si, Gyeonggi-do (KR)

(72) Inventors: Shivsharad Dhiman, Noida (IN); Arihant Jain, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/958,266

(22) Filed: Dec. 3, 2015

(65) Prior Publication Data

US 2016/0165299 A1    Jun. 9, 2016

(30) Foreign Application Priority Data

Dec. 4, 2014    (IN) ........................... 6105/CHE/2014
Oct. 23, 2015    (KR) ........................ 10-2015-0148170

(51) Int. Cl.
*H04N 21/431* (2011.01)
*H04N 21/41* (2011.01)
*H04N 21/438* (2011.01)
*H04N 21/81* (2011.01)
(Continued)

(52) U.S. Cl.
CPC ..... *H04N 21/4312* (2013.01); *H04N 21/4104* (2013.01); *H04N 21/4126* (2013.01); *H04N 21/42207* (2013.01); *H04N 21/4383* (2013.01); *H04N 21/482* (2013.01); *H04N 21/812* (2013.01)

(58) Field of Classification Search
CPC ........... H04N 21/4126; H04N 21/4222; H04N 21/42204; H04N 5/4403; H04N 21/4312; H04N 21/42207; H04N 21/482; H04N 21/4383; H04N 21/4104; H04N 21/812; G08C 2201/93
See application file for complete search history.

(56) References Cited

U.S. PATENT DOCUMENTS

| 6,721,953 B1* | 4/2004 | Bates ................. H04N 5/44543 348/E5.102 |
| 6,882,299 B1* | 4/2005 | Allport .............. H04N 21/8186 341/176 |
| 8,397,258 B2 | 3/2013 | Kim et al. |
| 2002/0056098 A1* | 5/2002 | White ...................... H04N 5/44 725/39 |

(Continued)

FOREIGN PATENT DOCUMENTS

JP    2002320165 A    * 10/2002

*Primary Examiner* — Junior O Mendoza
(74) *Attorney, Agent, or Firm* — Jefferson IP Law, LLP (57) ABSTRACT

A method and a system for facilitating channel control on a paired device are provided. The method includes extracting channel metadata information of each broadcast channel displayed on a display device, if an amount of display time of each broadcast channel exceeds a predetermined value. Further, the method includes transferring the channel metadata information of each viewed broadcast channel to the paired device. The method includes storing the channel metadata information of each viewed broadcast channel. Furthermore, the method includes displaying a plurality of icons on an interactive interface of the paired device, wherein each icon is based on the channel metadata information. Thereby, the method facilitates channel control through the interactive interface on the paired device.

16 Claims, 9 Drawing Sheets

(51) Int. Cl.
*H04N 21/482* (2011.01)
*H04N 21/422* (2011.01)

(56) References Cited

U.S. PATENT DOCUMENTS

| | | | | |
|---|---|---|---|---|
| 2005/0078223 | A1* | 4/2005 | Liu | G06K 9/325 |
| | | | | 348/701 |
| 2006/0101338 | A1* | 5/2006 | Kates | H04N 5/4403 |
| | | | | 715/716 |
| 2008/0259220 | A1* | 10/2008 | Stahulak | H04N 5/44543 |
| | | | | 348/734 |
| 2010/0115573 | A1* | 5/2010 | Srinivasan | H04N 7/163 |
| | | | | 725/131 |
| 2011/0035774 | A1 | 2/2011 | Parker | |
| 2011/0283311 | A1* | 11/2011 | Luong | H04N 21/414 |
| | | | | 725/28 |
| 2012/0154662 | A1* | 6/2012 | Yang | H04N 5/225 |
| | | | | 348/333.02 |
| 2012/0210367 | A1* | 8/2012 | Lee | H04N 21/4316 |
| | | | | 725/56 |
| 2012/0304229 | A1* | 11/2012 | Choi | H04N 21/8173 |
| | | | | 725/41 |
| 2013/0014150 | A1* | 1/2013 | Seo | H04N 21/44222 |
| | | | | 725/14 |
| 2014/0049695 | A1* | 2/2014 | Papish | H04N 21/44204 |
| | | | | 348/731 |
| 2014/0130101 | A1* | 5/2014 | Yoshitani | H04N 21/4126 |
| | | | | 725/52 |
| 2015/0304725 | A1* | 10/2015 | Itagaki | G06F 21/35 |
| | | | | 725/25 |
| 2016/0156957 | A1* | 6/2016 | Yun | H04N 21/4312 |
| | | | | 725/14 |

* cited by examiner

APPARATUS AND METHOD FOR FACILITATING CHANNEL CONTROL ON A PAIRED DEVICE

CROSS-REFERENCE TO RELATED APPLICATION(S)

This application claims the benefit under 35 U.S.C. § 119(a) of an Indian patent application filed on Dec. 4, 2014 in the Indian patent office and assigned Serial number 6105/CHE/2014 and of a Korean patent application filed on Oct. 23, 2015 in the Korean Intellectual Property Office and assigned Serial number 10-2015-0148170, the entire disclosure of each of which is hereby incorporated by reference.

TECHNICAL FIELD

The present disclosure relates to the field of providing a method and apparatus for interaction with a display device using a handheld device. More particularly, the present disclosure relates to the field of providing channel control on a paired device.

BACKGROUND

Typically, channel switching is made possible in the television (TV) by means of a remote controller. The remote controller is a device for controlling the TV. The remote controller enables the user to perform channel switching by inputting a channel number directly, and by sequentially pressing the up/down navigation buttons to navigate through the list of channels. Further, display device in the remote controller displays the last viewed channel. Recent advances in the field of handheld control devices have enabled the use of smartphones as a remote controller device for the TV. Examples of handheld control devices include, but are not limited to smart phones, tablet computers, smart watches, laptops. The handheld control devices are installed with control applications to simulate the functions of the remote controller in the handheld control devices. Examples of control application include but are not limited to "Google TV remote", "LG TV remote", "Xbox Smart glass", "Samsung WatchOn" and "Sony Media remote". The handheld control devices are hereinafter referred to as user control devices.

Existing control applications provide the channel program thumbnails in a display screen of the user control device. Often, it is desired to view the list of previously viewed broadcast channels to switch to a previously viewed broadcast channel. A user is navigating through the broadcast channels during a commercial break in the first viewed channel. And, the user wants to switch to the previously viewed channel. After a sequence of switches in channel, the user tends to forget the channel number of the first viewed channel. It is desired to switch to earlier viewed channels with a single touch on the user control device. Further, it is desired to provide an interface on the user control device with viewed channel history.

In an existing system, a channel history is displayed in the web browser of the display device. The system provides an interface for displaying thumbnails of broadcasted content on the paired device. However, the system does not provide a mechanism to send a channel switch command by selecting the thumbnail on the paired device. Further, the system does not provide easy navigation of previously viewed channels.

Even though other existing system displays a channel view history, they do not provide a user interface to select one channel among the channel view history. Further, the existing systems do not disclose a method of displaying channel view history data on the handheld device along with metadata information of the viewed channels.

In light of the foregoing discussion, there is a need for a method and system to facilitate channel control and navigation on a paired device, thereby providing easy navigation of previously viewed channels in a single touch. Further, it is desired to transfer the channel view history and related metadata information to the paired device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for interaction with a display device using a handheld device.

In accordance with an aspect of the present disclosure, an operation method of an apparatus for controlling a broadcast channel of an external device is provided. The operation method includes receiving, from the external device, metadata corresponding to a broadcast channel displayed on the external device, storing the metadata in a database, displaying, on a user interface, one or more icons corresponding to metadata accumulated in the database, and controlling the broadcast channel displayed on the external device through the one or more icons displayed on the user interface.

In accordance with another aspect of the present disclosure, an operation method of an apparatus for controlling an application of an external device is provided. The operation method includes receiving, from the external device, metadata corresponding to an application browsed on the external device, storing the metadata in a database, displaying, on a user interface, one or more icons corresponding to metadata cumulatively stored in the database, and controlling the application executed on the external device through the one or more icons displayed on the user interface.

In accordance with another aspect of the present disclosure, an apparatus for controlling an external device is provided. The apparatus includes a reception unit configured to receive, from the external device, at least one among metadata corresponding to a broadcast channel displayed on the external device and metadata corresponding to an application browsed on the external device, a storage unit configured to store the received metadata in a database, a user interface configured to display one or more icons corresponding to metadata accumulated in the database, and a control signal generating module configured to generate a signal for controlling the broadcast channel displayed on the external device or the application executed on the external device, through the one or more icon displayed on the user interface.

In accordance with another aspect of the present disclosure, an electronic apparatus is provided. The electronic apparatus includes a display unit configured to display a broadcast channel and an application, a connection detection unit configured to detect a connection by an external device which has a control application, a metadata generating unit configured to generate at least one of metadata corresponding to the broadcast channel and metadata corresponding to the application, and a communication unit configured to transmit the generated metadata to the external device and receives, from the external device, a broadcast channel control signal or application control signal corresponding to the transmitted metadata.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Various embodiments of the present disclosure described herein provide a method and system for facilitating channel control on a paired device. The system displays a plurality of icons on an interactive interface of the paired device. Each icon is based on the channel metadata information of a viewed channel. Therefore, the system enables a user to control channels through the interactive interface on the paired device.

Figure 1:
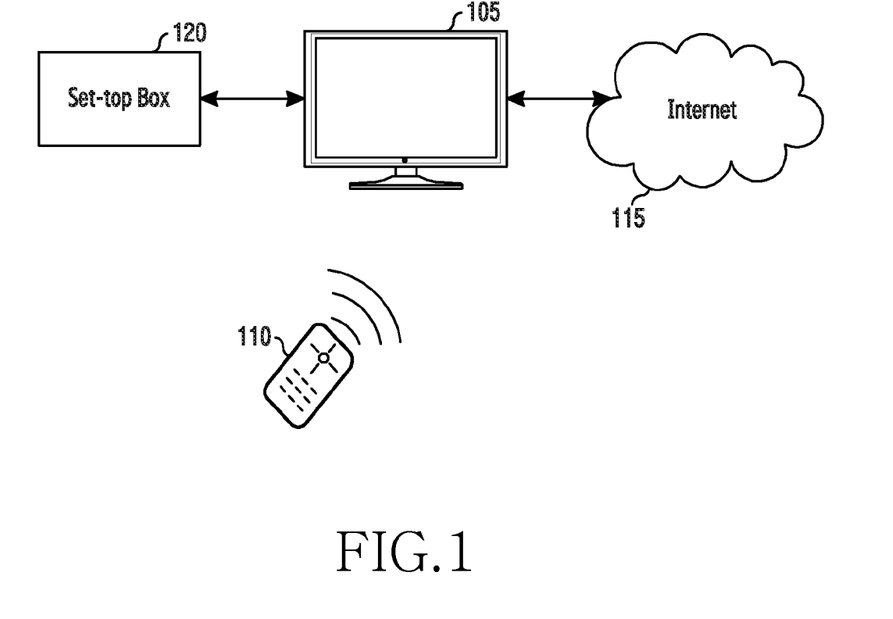
FIG. 1 illustrates a block diagram of an environment according to various embodiments of the present disclosure.

FIG. 1 is illustrates a block diagram of an environment according to various embodiments of the present disclosure.

Referring to FIG. 1, the environment includes a set top box (STB) 120, a display device 105, and a handheld device 110. The display device 105 is at least one of a television (TV), a liquid crystal display (LCD) monitor, a smart glass, a smart TV, a personal digital assistant, a tablet, an electronic device, and a smart phone. A user views a broadcasted content from one of cable, satellite, and Internet service providers, on the display device 105. The STB 120 is an information appliance device that generally contains a TV-tuner input and display output to deliver a broadcast content. The STB 120 is connected to a TV set and a source signal. Thereafter, the STB 120 tunes the source signal into a digital content format. The digital content is displayed on the display device 105. The display device 105 browses contents and applications from Internet 115. The environment provides real-time streaming of contents and applications via the Internet 115. The display, control and navigation of the broadcast content and the applications on the display device 105 are controlled by a handheld device 110. The display device 105 is paired to the handheld device 110 by communication protocols including one of Bluetooth, Wi-Fi, infrared, near field communication (NFC), radio frequency (RF) and other wireless communication systems. Examples of the handheld device 110 are at least one of a user input device, and a control device paired to the display device 105. The handheld device 110 may be at least one of a remote controller, a smart phone, a smart gear, a smart glass, and a tablet. Hereinafter, the handheld device 110 is referred to as a paired device.

Figure 2:
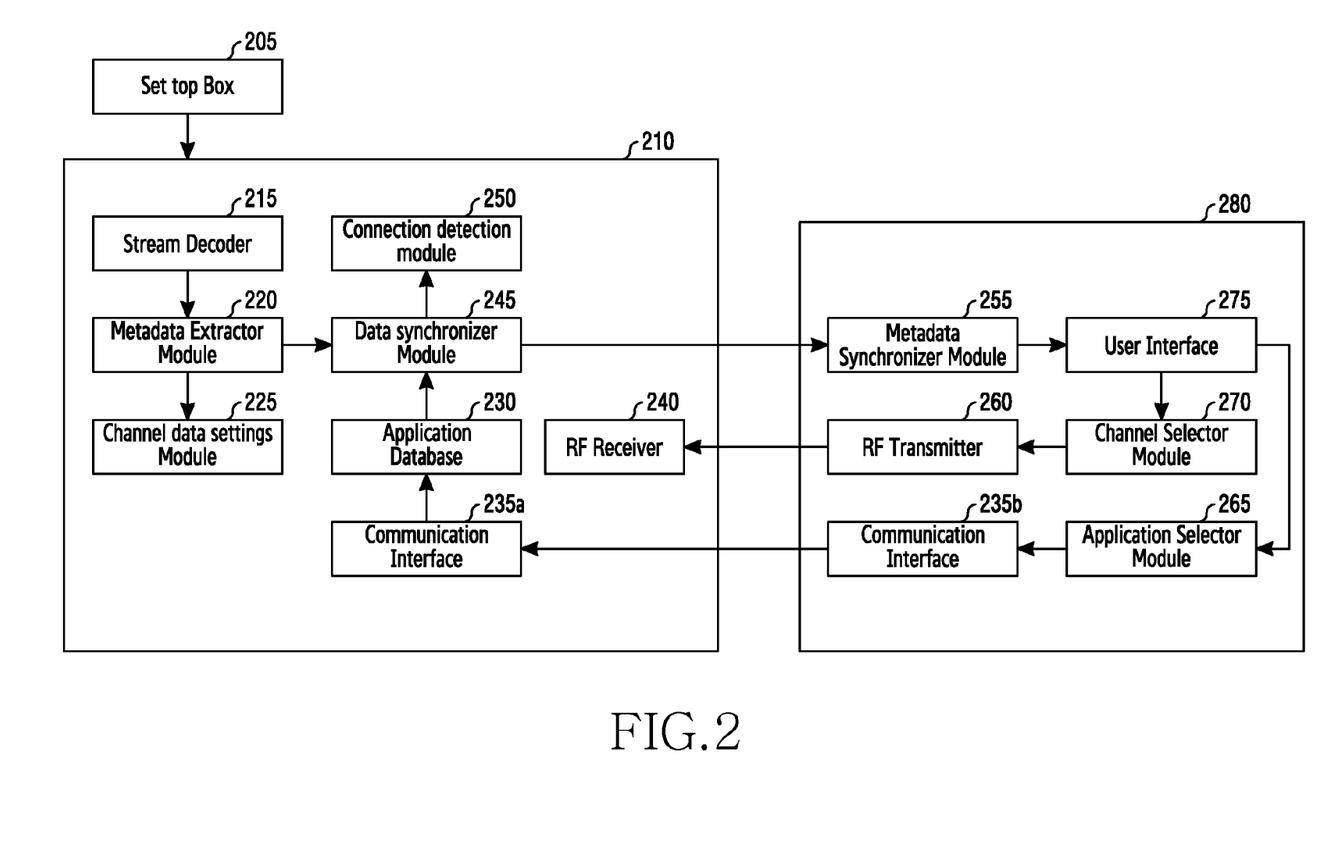
FIG. 2 illustrates a block diagram of a system for facilitating channel control according to an embodiment of the present disclosure.

FIG. 2 illustrates a block diagram of a system for facilitating channel control according to an embodiment of the present disclosure.

Referring to FIG. 2, the system includes a STB 205, a display device 210 and a paired device 280. The display device 210 includes a stream decoder 215, a metadata extractor module 220 (or may be referred to as a metadata generating module), a channel data settings module 225, a connection detection module 250, a data synchronizer module 245, an application database 230, an RF receiver 240, and a first communication interface 235a. Further, the paired device 280 includes a metadata synchronizer module 255, a user interface 275, a RF transmitter 260, a channel selector module 270, a second communication interface 235b, and an application selector module 265. The STB 205 delivers secure high definition content from cable providers and satellites to the display device 210. In an embodiment of the present disclosure, the STB 205 is connected to an Ethernet cable to provide live-streaming of content to the display device 210. The stream decoder 215 in the display device 210 decodes a digital signal received in the STB 205.

The main modules in the display device 210 for facilitating channel control in the paired device 280 are described below:

The channel data settings module: The channel data settings module 225 available in the settings of the display device 210 enables a user to set a minimum viewing time for each broadcast channel among the plurality of broadcast channels received at the STB 205. The minimum viewing time is hereinafter referred to as predefined channel duration. The time duration for which each broadcast channel is viewed by a user is called "viewing time". If the viewing time of the broadcast channel is one of greater than and equal to the predefined channel duration, the broadcast channel content is eligible for metadata extraction. If the user has not set the predefined duration manually, the channel data settings module 225 sets a default channel duration. In an embodiment, the default channel duration is set as five minutes.

The metadata extractor module 220 in the display device 210 extracts channel metadata information of a broadcast channel being viewed by a user in the display device 210. The broadcast channel metadata information includes, but is not limited to program name, channel name, genre, keywords, metadata, subtitles, channel logo, channel number, a parental information, channel snapshot, and additional information comprising advertisements and channel signal strength. Further, the metadata extractor module 220 checks settings of the display device 210 by interacting with the channel data setting module 225. The Channel data setting module 225 determines the eligibility of the broadcast channel for metadata extraction. The metadata extractor module 220 sends the channel metadata information to a data synchronizer module 245.

The application database 230 displays a plurality of widgets and applications available on the display device 210. The application database 230 retrieves application metadata of each browsed application. Contents of the applications metadata includes but is not limited to information regarding application icon, application name, application type. The application database 230 sends the application metadata information to the data synchronizer module 245. The data synchronizer module 245 is sends the channel Metadata information and the application metadata information to a plurality of paired devices. The display device 210 communicates with the paired device 280 through the first communication interface 235a and the second communication interface 235b. The communication protocols include but are not limited to Bluetooth, NFC, Wi-Fi.

Connection detection module: The connection detection module 250 displays a connection list between the display device 210 and the paired device 280. The paired device can be one of remote controller, smartphone, tablet, and a smart gear. At an instance of time, there is a plurality of paired devices connected to the display device 210. From the available list of paired devices as illustrated in Table 1, the user can select at least one paired device to display the metadata information. The display device 210 transfers the channel Metadata information to the selected paired device. Further, the connection detection module 250 determines if the plurality of paired devices connected to the display device 210 has control applications installed. Examples of control application include but are not limited to "Google TV remote", "LG TV remote", "Xbox Smart glass", "Sony Media remote", "Samsung WatchOn Application". The Metadata information is transferred to a first group of paired devices installed with the control application.

TABLE 1

| Connected Devices | watchON Installed | TV Logo can be shown | Show TV Channel Metadata |
|---|---|---|---|
| Amit Tablet phone | No | No | Not Allowed |
| Ari Smart Gear | Yes | Yes | Yes |
| Messi_Smart Remote | Yes | Yes | No |

Data synchronizer: The Data synchronizer module 245 transfers channel metadata information to the paired device 280. The Data synchronizer module 245 interacts with the connection detection module 250 and transfer the channel metadata information to the first group of paired devices.

An illustration of viewing time and metadata extract status for various broadcast channels is depicted in Table 2. The default channel duration of broadcast channels MTV, CNN, and ZTV is 5 minutes. In Table 2, viewing time for MTV is 10 minutes, and viewing time for CNN is 5 minutes. Viewing times of MTV and CNN are greater than the default channel duration. As a result, the metadata extractor module 220 extracts channel metadata information from MTV and CNN. However, viewing time of ZTV is 30 sec. The viewing time of ZTV is lesser than the default channel duration. As a result, the metadata extractor module 220 fails to extract channel metadata information of ZTV. Herein, five minutes, which is set as the basic channel duration, is presented for a description and a longer or shorter time may be set according to other various embodiments.

TABLE 2

| CHANNEL | Viewing Time | Metadata Extract |
|---|---|---|
| MTV | 10 minutes | Yes |
| CNN | 5 minutes | Yes |
| ZTV | 30 seconds | No |

The paired device 280 is installed with the control application. The Metadata synchronizer module 225 continuously receives channel metadata information from the data synchronizer module 245. Further, the metadata synchronizer module 255 checks new channel metadata information received from the data synchronizer module 245. The new channel metadata information corresponding to a switch of displayed content is received by the paired device 280. Further, the paired device 280 stores the new channel metadata information to a database in the paired device 280. Further, the paired device 280 displays the new channel metadata information on the interactive user interface 275 of the paired device 280. The interactive user interface 275 displays channel metadata information regarding multiple broadcast channels and applications viewed by the user. The channel metadata information corresponding to multiple viewed broadcast channels and applications is represented as a plurality of icons on a display screen of the paired device 280. The plurality of icons is arranged in an order as viewed by the user. The plurality of icons is displayed in one of a grid format, and a list format. The user can set a limit for number of icons displayed on the interactive user interface 275.

In response to a user selection of a first icon on the interactive user interface 275, a channel selector module 270 fetches a first channel number corresponding to the first icon. The channel selector module 270 sends the first channel number to the RF transmitter 260. The RF transmitter 260 generates a first RF signal of particular channel frequency corresponding to the first channel. The first RF signal is received by the RF receiver 240 in the display device. As a result, the currently viewed channel in the display device 210 is replaced by a first channel in response to the first RF signal. Thus, the system enables navigation of previously viewed channels through the user interface 275.

If a selected icon on the user interface 275 corresponds to an application, the application selector module 265 fetches the selected application information from the metadata synchronizer module 255. The application selector module 265 sends the application information from the second communication interface 235b to the first communication interface 235a. The protocols used in the first communication interface 235a and the second communication interface 235b include one of Bluetooth, NFC, Wi-Fi, and other wireless transfer protocols. When the application information is received by the display device 210, the application database 230 checks for the corresponding application identification (ID), or application name. The application database 230 opens the corresponding application on the display device 210 to replace a currently viewed content. Thus, the system enables navigation of previously browsed applications through the user interface 275.

Apart from navigation of previously browsed applications, the system provides multiple control operations for the user. The control operations enable the user to control the display device 210 via the paired device 280. The control operations on the paired device 280 include:
  providing parental control for broadcast channels;
  switching of channels based on information of commercials;
  providing snapshots of programs in a broadcast channel; and
  providing channel signal strength information.

In an embodiment of the present disclosure, providing parental control for broadcast channels includes displaying parental rating information of the viewed broadcast channels on the paired device. Further, the method includes enabling a user to block one or more broadcast channels displayed on the paired device based on the parental rating information. Thus, the paired device notifies the display device with channel ID information of the one or more blocked channels. A lock icon is displayed along with the metadata information of each viewed channel on the interactive interface of the paired device. The control application in the paired device enables the user to lock at least one channel on the user interface by pressing the lock icon. Thus, the present disclosure restricts users from watching the locked channel.

In another embodiment of the present disclosure, switching of channels based on information of commercials includes transferring metadata information of commercials associated with a viewed channel to the paired device. Further, the paired device stores the metadata information of commercials in a database. The paired device displays the metadata information of commercials in a specific color format along with each icon on the interactive interface. The specific color format includes a first color format and a second color format. The first color format indicates an active status of commercials in a corresponding channel. The second color format indicates an active status of broadcast content in the corresponding channel.

In another embodiment of the present disclosure, the control application enables the paired device to display a plurality of broadcast program snapshots in a channel history tab of the paired device. The paired device updates the channel history tab with a snapshot of a currently broadcasted program of channel. In an example, a user is watching a live cricket match in "ESPN". Later, the user changes the channel to view an important program. The metadata of "ESPN" is displayed on the paired device and a snapshot of cricket match is displayed in the channel history tab. The channel history tab updates the snapshot of "ESPN" with current score of the cricket match and notifies the user. Thus, the user switches to "ESPN" during a critical event in the match.

In yet another embodiment of the present disclosure, the control application enables the paired device to display channel signal strength information along with each icon from the plurality of icons on the interactive interface of the paired device. Further, the control application updates the channel signal strength information dynamically. In an example, the paired devices displays signal strength icon along with the channel logo icon. The user can check the icons and switch back to a first channel when the signal strength for the first channel is good.

Figure 3:
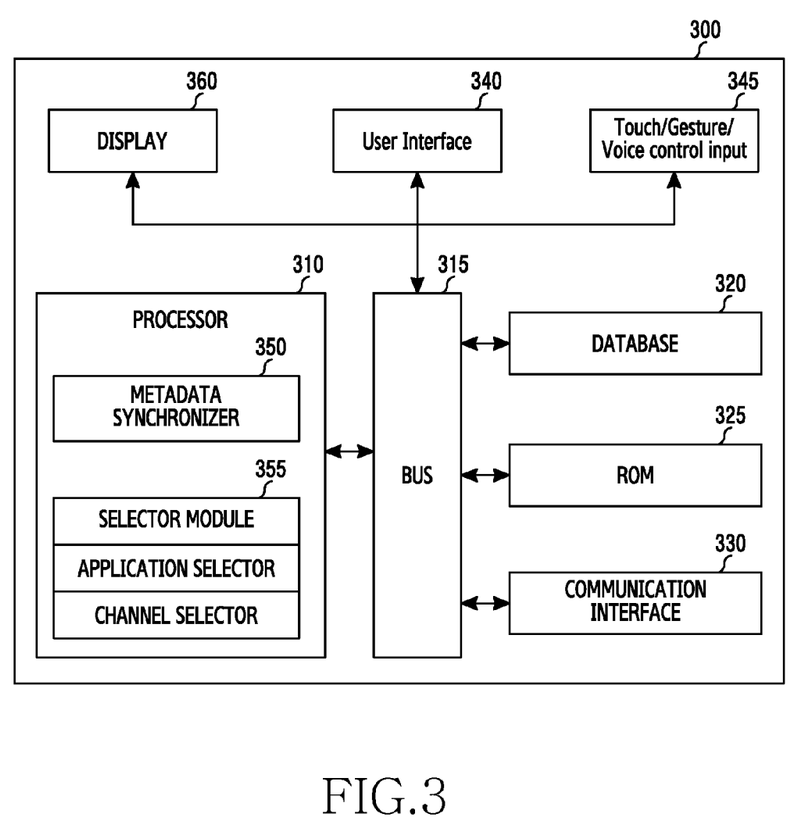
FIG. 3 is a block diagram of the paired device for facilitating channel control according to an embodiment of the present disclosure.

FIG. 3 is a block diagram of a paired device 300 capable of facilitating channel control according to an embodiment of the present disclosure.

Referring to FIG. 3, the paired device 300 is installed with a control application. The control application enables a user to control a display device using the paired device 300. Further, the control application enables navigation to previously viewed channels and previously browsed applications on the paired device. The paired device 300 consists of a metadata synchronizer 350 and a selector module 355. The selector module 355 further consists of an application selector and a channel selector.

The metadata synchronizer 350 updates a database 320 with channel metadata information of a broadcast channel last displayed on the display device. Further, the metadata synchronizer 350 receives application information from the display device. Information corresponding to any browsed application is transferred to the metadata synchronizer 350 and stored in database 320. Further, the paired device 300 displays channel metadata information regarding multiple broadcast channels and applications viewed by the user. The paired device 300 displays channel metadata information as a plurality of icons on a user interface 340. Each of the plurality of icons corresponds to channel metadata information of a different broadcast channel viewed by the user. The plurality of icons is arranged in accordance with order of viewing by the user. Each of the plurality of icons corresponds to a last viewed content and metadata information is displayed along with the icon to identify the channels. Typically, logos of the last viewed channels are displayed as icons. Other metadata information displayed on the user interface include program name, channel name, genre, keywords, metadata, subtitles, channel logo, channel number, a parental information, channel snapshot, and advertisement information.

The application selector module enables the user to select a first icon from the plurality of icons on the user interface 340, wherein the first icon represents a browsed application. The channel selector module enables selection of a second icon from the plurality of icons on the user interface 340, wherein the second icon represents a viewed channel. The user interface 340 provides navigation of at least one of a viewed channel and a browsed application.

The paired device 300 hereinafter referred to as device 300 includes at least one of a bus 315 and other communication mechanism for communicating information. The device 300 includes a processor 310 coupled with the bus 315. The processor 310 includes an integrated electronic circuit for processing and controlling functionalities of the device 300. The processor 310 includes the metadata synchronizer 350 and the selector module 355 for facilitating channel control in the device 300.

Further, the device 300 includes the database 320, coupled to the bus 315 for storing information to be used by the processor 310. The database 320 is a memory and can be used for storing any temporary information required. The database 320 is a storage unit, such as a magnetic disk or optical disk. The database 320 is coupled to the bus 315 for storing information.

Various embodiments are related to the use of the device 300 for implementing the techniques described herein. In an embodiment, the techniques are performed by the processor 310 using information included in a read only memory (ROM) 325. The information can be read into the ROM 325 from another machine-readable medium. The instructions are stored in the database 320.

The term "machine-readable medium" as used herein refers to a medium that participates in providing data that causes a machine to operate in a specific fashion. In an embodiment implemented using the device 300, various machine-readable medium are involved, for example, in providing information to the processor 310. The machine-readable medium can be a storage media. Storage media includes both non-volatile media and volatile media. Non-volatile media includes, for example, optical or magnetic disks, such as the ROM 325. Volatile media includes dynamic memory, such as the database 320. All such media must be tangible to enable the information carried by the media to be detected by a physical mechanism that reads the information into a machine Common forms of machine-readable medium include, for example, a floppy disk, a flexible disk, hard disk, magnetic tape, or any other magnetic medium, a compact disc ROM (CD-ROM), any other optical medium, punch cards, paper tape, any other physical medium with patterns of holes, a random access memory (RAM), a programmable ROM (PROM), an erasable programmable (EPROM), a flash-EPROM, any other memory chip or cartridge. In another embodiment, the machine-readable medium can be a transmission media including coaxial cables, copper wire and fiber optics, including the wires that include the bus 315. Transmission media can also take the form of acoustic or light waves, such as those generated during radio-wave and infra-red data communications. The device 300 also includes a communication interface 330 coupled to the bus 315. The communication interface 330 provides a two-way data communication and coupling to the database 320.

The device 300 is coupled via the bus 315 to a display 360, such as but not limited to one of a cathode ray tube (CRT), a LCD and a light emitting diode (LED) display, for displaying information. The user interface 340, including alphanumeric and other keys, is coupled to the bus 315 for receiving an input from the user. Another type of user input device is a Touch, Gesture, or Voice control 345, such as a swipe, pattern, remote control device, a touch pad, a gesture, voice, touch ball, attentive user interfaces, text based interfaces, and a mouse and cursor direction keys for communicating the input to the processor 310. The paired device consists of a display 360. Examples of the display 360 include but are not limited to CRTs, LCD TVs, and LED TVs. The user interface 340 can also be included in the display 360, for example a touch screen.

Figure 4:
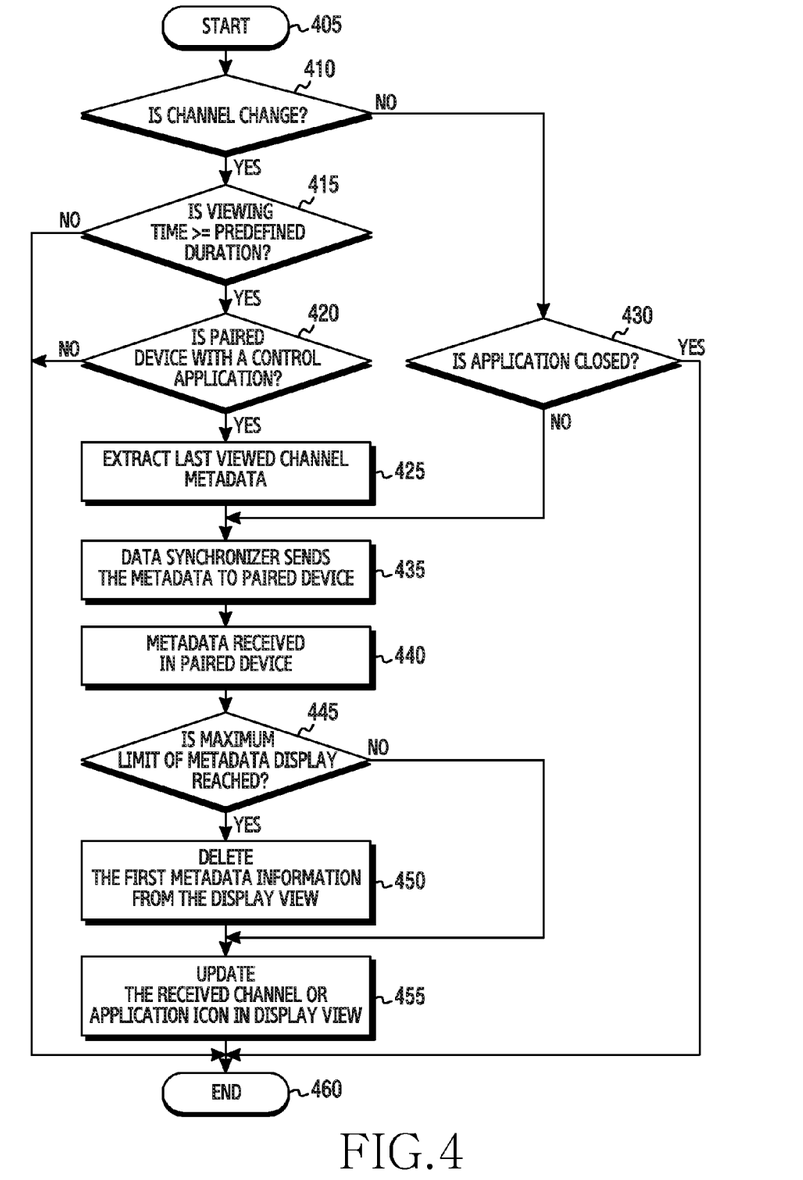
FIG. 4 is a flow diagram illustrating channel control on the paired device according to an embodiment of the present disclosure.

FIG. 4 illustrates a flow diagram for facilitating channel control on a paired device according to an embodiment of the present disclosure. The process begins at operation 405.

Referring to FIG. 4, at operation 410, a display device determines a switch in one of a broadcast channel and an application. The broadcast channel is provided by the STB and browsing of applications is supported by an application database in the display device. A handheld paired device generates a command for the switch in a viewed content. The viewed content can be one of the broadcast channel and application. If a change in broadcast channel is detected, then operation 415 is performed, else operation 430 is performed.

At operation 415, the 'viewing time' of the last viewed broadcast channel is determined. A predefined duration of time is set by a user. The viewing time of the broadcast channel is compared to the predefined duration. If the viewing time is equal to or greater than the predefined duration, then operation 420 is performed, else operation 460 is performed.

At operation 420, a Connection detection module in the display device identifies the plurality of paired devices installed with a control application. If at least one of the paired devices is detected with a control application, then operation 425 is performed, else operation 460 is performed.

At operation 425, a Channel metadata extractor module in the display device will extract the Metadata information of last viewed broadcast channel. The broadcast channel metadata information includes, but is not limited to program name, channel name, genre, keywords, metadata, subtitles, channel logo, channel number, a parental information, channel snapshot, and additional information comprising advertisements.

At operation 435, a Data synchronizer will send the extracted Metadata information to all paired devices installed with a control application. If the last viewed content is application, then metadata information corresponding to the application is transferred to the paired device.

At operation 435, the metadata information is sent to the metadata synchronizer of the paired device from the channel metadata extractor module. At operation 435, if closure of the application is detected, then Application database will provide all application metadata to the paired device.

At operation 440, the Metadata information is received in connected devices through the metadata synchronizer module. The metadata information can be one of channel information and application information. An icon is displayed in the control application of the paired device in response to the metadata information. In the process, a plurality of icons is displayed as a display list corresponding to a plurality of switches in the displayed content.

At operation 445, the Metadata synchronizer module checks for new metadata information received. Further, the Metadata synchronizer module determines if the display list in the paired device has space to show the newly added icons corresponding to the Metadata information. If a maximum limit of display list is detected, then operation 450 is performed, else operation 455 is performed.

At operation 450, a first icon is deleted from the display list and the display list is arranged in order of channel view history. Icons corresponding to channels and applications are updated in the display list in respective order of browsing history.

At operation 455, the new metadata information is added at the last of the display list. Further, the user is enabled to select at least one icon from the plurality of icons on the display list on the paired device. The icon selection and navigation of previously viewed channels is further illustrated in FIG. 5. The flowchart ends at operation 460.

Figure 5:
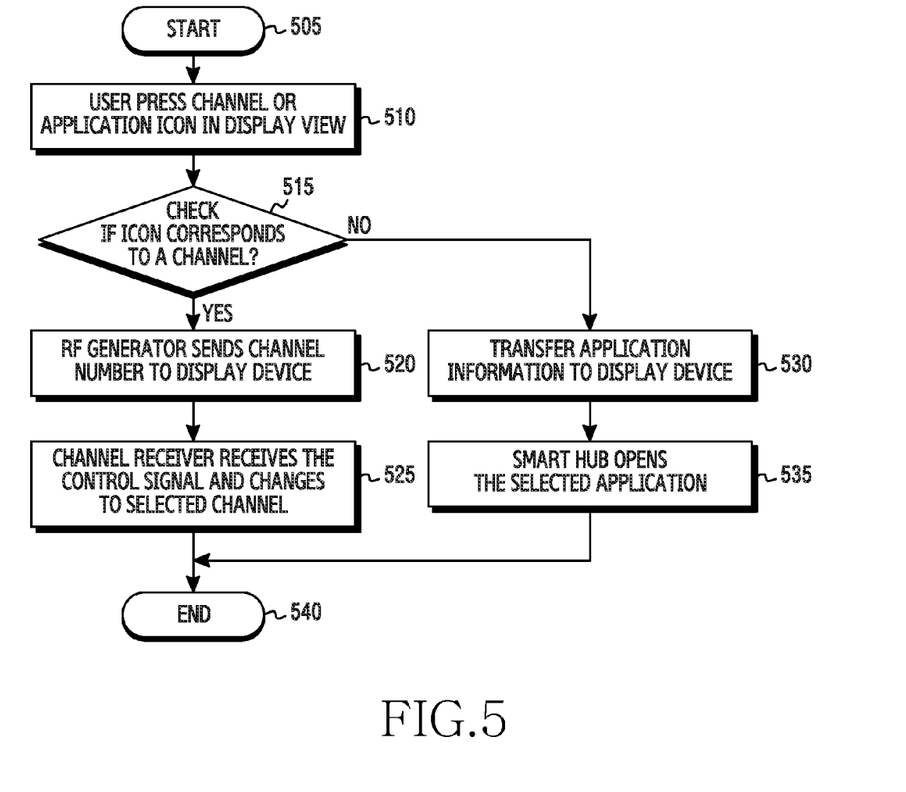
FIG. 5 is a flow diagram illustrating a method for navigation of previously viewed channels on the paired device according to an embodiment of the present disclosure.

FIG. 5 is a flow diagram illustrating a method for navigation of previously viewed channels on the paired device according to an embodiment of the present disclosure. The process begins at operation 505.

Referring to FIG. 5, at operation 510, user selects a first icon from a plurality of icons on an interactive interface of the paired device. The first icon represents at least one of a first viewed broadcast channel and a browsed application.

At operation 515, a channel selector determines if the first icon represents a broadcast channel. An application selector determines if the first icon represents an application. If the first icon represents the broadcast channel, then operation 520 is performed, else operation 530 is performed.

At operation 520, a control signal is generated by the channel selector in response to the selection of the first icon. The channel selector retrieves channel information including channel ID and channel name from the first icon and generates the control signal corresponding to the channel ID. The control signal is sent to the display device for switching the currently viewed broadcast channel with the selected channel ID. In this scenario, the control signal is an Infra-red signal.

At operation 525, the RF receiver module in the display device receives the control signal, thereby replaces a currently viewed broadcast channel to display a first channel in response to the control signal.

At operation 530, the application selector retrieves application information including application ID and application name from the first icon. The application information is transferred to the display device using file transfer protocol if the first icon corresponds to an application.

At operation 535, an application database in the display device opens the selected application to replace a currently viewed content. The flowchart ends at operation 540.

Figure 6:
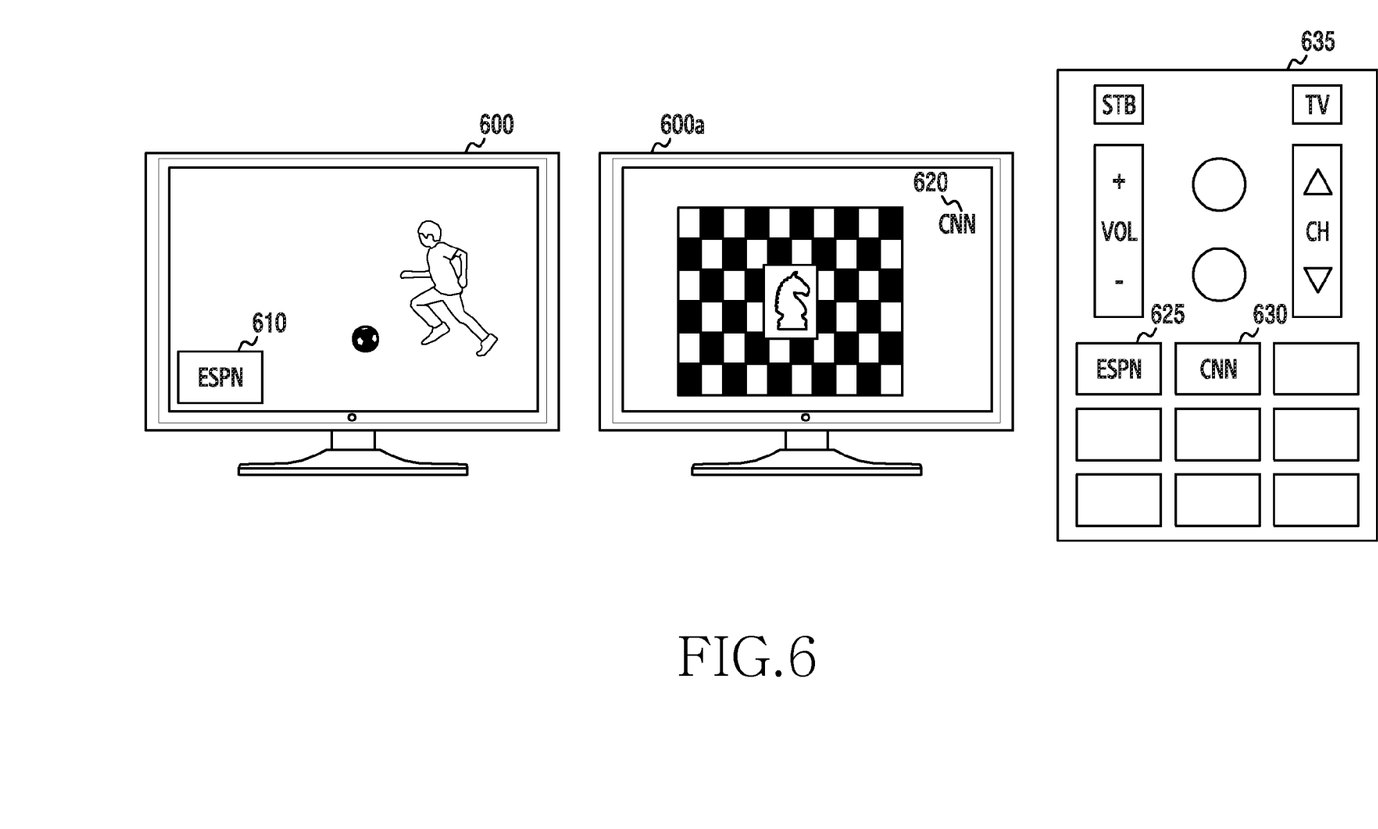
FIG. 6 is an illustration of displaying channel metadata information of each viewed broadcast channel to the paired device according to an embodiment of the present disclosure.

FIG. 6 is an illustration of displaying channel metadata information of each viewed broadcast channel to a paired device according to an embodiment of the present disclosure.

The paired device is installed with a control application. The metadata information of broadcast channels are transferred to the paired devices installed with the control application. The control application provides an interactive user interface 635 on the display of the paired device.

In an example, referring to FIG. 6, a user is viewing the broadcast channel "ESPN" on the display 600. The user views "ESPN" for a time duration 't'. Later, the user switches the broadcast channel to "CNN". If the time duration 't' is greater or equal to a predefined duration, then the metadata information of "ESPN" is transferred to the paired device. The channel metadata information includes but is not limited to broadcast channel logo, parental information, and commercial information.

The channel metadata like Parental Information, Program information, and channel number is retrieved from a channel elementary stream received in the display device. The channel logo is detected by using an algorithm based on the fact that logo is static in nature. The logo region in the video frames is always a static part and does not change with respect to time. The video frames are subsampled from the video broadcast. Typically, logo in the video is expected to be found in any of the four corners of the frame. Further, the video frame is divided into four parts. The presence of a logo is identified by determining the corner persistent in each frame.

Therefore, in the above example, the "ESPN" logo is identified in the region 610 of the display 600. The channel logo "ESPN" and other metadata information is extracted and transferred to the paired device. The "ESPN" logo is displayed as a first icon 625 on the user interface 635 of the paired device. The user can switch to the channel "ESPN" with a single touch on the first icon 625. Further, the user switches the broadcast channel from "CNN" to "MTV". Since the display time of broadcast channel "CNN" exceeds the predefined duration, the metadata information of "CNN" is extracted from a display 600*a*. The channel logo "CNN" is identified in the region 620 of the display 600*a*. Further, the "CNN" logo is displayed as a second icon 630 on the user interface 635 of the paired device. The user interface 635 is updated for all broadcast channels viewed. Thus, the present disclosure provides a plurality of icons representing a plurality of previously viewed channels on the paired device.

Figure 7:
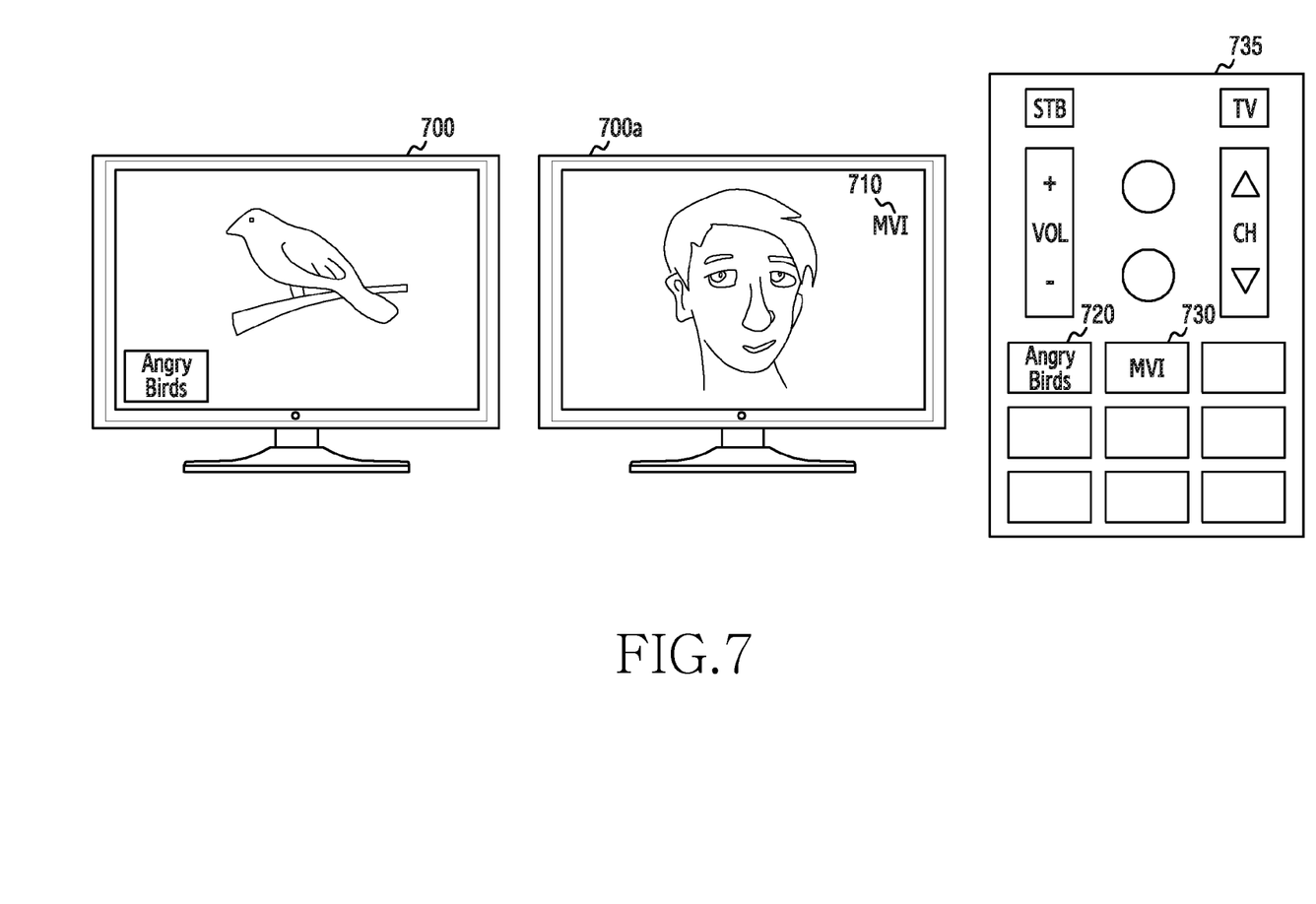
FIG. 7 is an illustration of displaying application metadata information of each browsed application on the paired device according to another embodiment of the present disclosure.

FIG. 7 is an illustration of displaying application metadata information of each browsed application on a paired device according to another embodiment of the present disclosure.

A control application provides an interactive user interface 735 on the display of the paired device. In an example, referring to FIG. 7, a user is accessing an application "Angry Bird" from an application database on the display 700. After a period of time, the user switches to a broadcast channel "MVI". In the above mentioned scenario, the metadata information of "Angry Bird" is extracted and transferred to the user interface 735 on the paired device. Therefore, the "Angry Bird" metadata is displayed as a first icon 720 on the user interface 735. Further, the user switches to a broadcast channel "CNN" from the currently viewed broadcast channel "MVI". The metadata information of "MVI" is extracted and the logo of "MVI" is identified in a region 710 of a display 700*a*. The channel logo "MVI" is displayed as a second icon 730 on the user interface 735. Thus, both application metadata and broadcast channel metadata are displayed in the user interface 735 in same order as viewed by the user.

Figure 8:
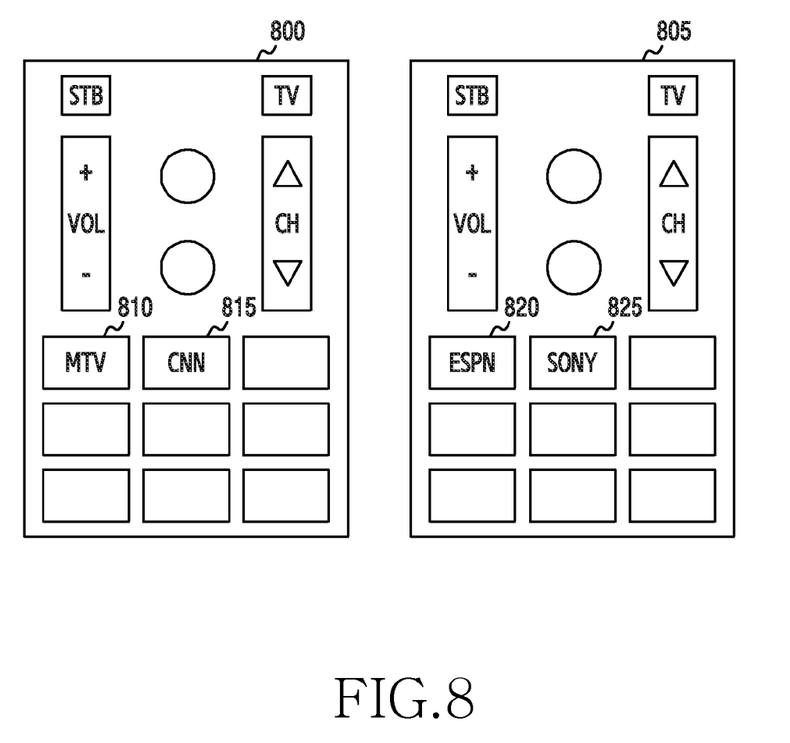
FIG. 8 is an illustration for displaying metadata information on different paired devices based on view history of different users on the same display device according to an embodiment of the present disclosure.

FIG. 8 is an illustration for displaying metadata information on different paired devices based on view history of different users on same display device according to an embodiment of the present disclosure.

A channel list is maintained for a user in a user control application of the paired device based on the view history of the user. In a scenario, referring to FIG. 8, a first list of metadata information is stored in a user interface 800 of a first paired device, and a second list of channel metadata information is stored in a user interface 805 of a second paired device. The first list of channel metadata information is based on channel viewing history of a first user. The second list of channel metadata information is based on channel viewing history of a second user. The first user uses the first paired device to navigate channels and applications in a display device. The second user uses the second paired device to navigate channels and applications in the display device. The first list of channel metadata information includes icons such as "MTV" 810, "CNN" 815 displayed in a grid format on the user interface 800. The second list of channel metadata information includes icons such as "ESPN" 820, "SONY" 825 displayed in a grid format on the user interface 805.

In an embodiment, if the display device restarts, the first list of channel metadata information and the second list of channel metadata information are maintained in the user interface 800 and the user interface 805 respectively.

Figure 9:
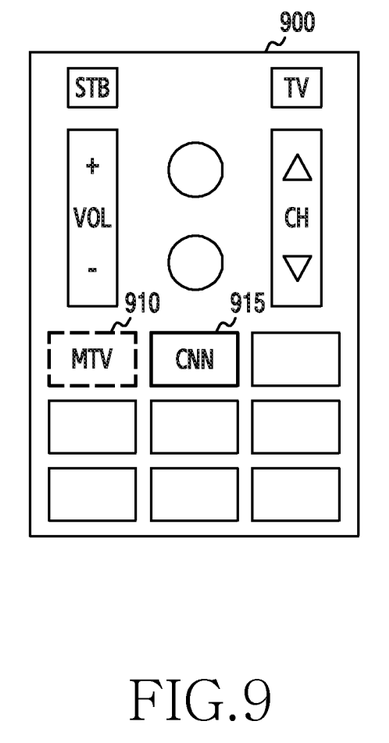
FIG. 9 is an illustration for displaying advertisement information along with the channel metadata information on the paired device according to an embodiment of the present disclosure.

FIG. 9 is an illustration for displaying advertisement information along with metadata information on a paired device according to an embodiment of the present disclosure.

In a scenario, referring to FIG. 9, a user viewing a broadcast channel "MTV" switches to a broadcast channel "CNN" because of an advertisement content being played in broadcast channel "MTV". As a result, an icon "MTV" 910 is displayed on a user interface 900 of the paired device. The icon "MTV" 910 is highlighted in a first color indicating an active status of advertisement in the broadcast channel "MTV". Further, the user switches to another broadcast channel "MVI" from the currently viewed channel "CNN". Thus, an icon "CNN" 915 is displayed on the user interface 900 of the paired device. The broadcast channel "CNN" is displaying a broadcast program. Hence, the icon "CNN" 915 is highlighted in a second color indicating an active status of broadcast program in broadcast channel "CNN".

Advantageously, the present disclosure prevents the user from memorizing the channel number. The user can switch to the previously viewed channel by one touch on the channel logo displayed on the paired device. The present disclosure provides easy identification of the broadcast content or application with Meta data information displayed. The present disclosure enables user to access the viewed channel history. Multiple devices can be used at a same time. The present disclosure enables parents to lock the broadcast channels or other adult content applications.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An operation method of an apparatus for controlling a broadcast channel of an external device, the method comprising:
   receiving input for setting a pre-determined length of time;
   receiving, from the external device, metadata corresponding to a broadcast channel displayed for a length of time exceeding the pre-determined length of time on the external device, wherein the metadata includes a logo of the broadcast channel and the logo of the broadcast channel is identified from a predefined region of a screen of the external device;
   storing the received metadata in a database;
   determining whether a number of icons corresponding to broadcast channels in a channel list is a threshold number before adding an icon corresponding to the broadcast channel to the channel list;
   identifying an icon corresponding to another broadcast channel that is unselected for being viewed for a longest period of time in the channel list based on a determination that the number of icons is the threshold number;
   adding the icon corresponding to the broadcast channel in the channel list after deleting the icon corresponding to the other broadcast channel;
   displaying a user interface (UI) comprising the channel list and icons in the channel list, wherein the icons include logos of broadcast channels to which the broadcast channel is added; and
   in response to detecting an input on the icon corresponding to the broadcast channel, transmitting, to the external device, a signal for instructing to display the broadcast channel corresponding to the icon on the external device.

2. The method of claim 1, further comprising:
providing an interface to perform at least one among:
   navigating previously displayed broadcast channels,
   providing a parental control of broadcast channels,
   switching the external device to another broadcast channel based on advertisement information,
   providing snapshots of programs in the at least one previous broadcast channel, or
   providing broadcast channel signal strength information of the broadcast channel and of the at least one previous broadcast channel.

3. The method of claim 1, further comprising:
receiving, from the external device, parental rating information of at least one broadcast channel program;
determining at least one blocked broadcast channel program of the at least one broadcast channel program based on the parental rating information; and
displaying the UI indicating the at least one blocked broadcast channel program.

4. The method of claim 1, further comprising:
receiving, from the external device, advertisement metadata corresponding to the broadcast channel;
storing the advertisement metadata corresponding to the broadcast channel in the database; and
displaying the UI comprising the advertisement metadata by using an icon including color information.

5. The method of claim 4, wherein the color information includes a first color indicating an activated state of the advertisement metadata and a second color indicating the activated state of a broadcast content corresponding to the broadcast channel.

6. The method of claim 1, further comprising:
displaying a history tab comprising a plurality of broadcast channel program snapshots; and
updating the channel history tab by a snapshot of a broadcast channel program which is currently being broadcast in a corresponding broadcast channel.

7. The method of claim 1, further comprising:
displaying, along with the icon corresponding to the broadcast channel, channel signal strength information of the broadcast channel;
receiving, from the external device, another channel signal strength information for the broadcast channel; and
updating the channel signal strength information of the broadcast channel based on the received other channel signal strength information.

8. The method of claim 1, wherein the storing of the metadata in the database comprises updating and synchronizing the database.

9. The method of claim 1, wherein the metadata further comprises at least one of: a program name, a channel name, a genre, a keyword, a subtitle, a channel number, parental information, a channel snapshot, or additional information including an advertisement.

10. The method of claim 1, wherein the predefined region is a region which remains unchanged for a predetermined time in the screen.

11. An operation method of an apparatus for controlling an application of an external device, the method comprising:
   receiving input for setting a pre-determined length of time;

receiving, from the external device, metadata corresponding to an application browsed for a length of time exceeding the pre-determined length of time on the external device, wherein the metadata includes a logo of the application and the logo of the application is identified from a predefined region of a screen of the external device;

storing the received metadata in a database;

determining whether a number of icons corresponding to applications in an application list is a threshold number before adding an icon corresponding to the application to the application list;

identifying an icon corresponding to another application that is unselected for being opened for a longest period of time in the application list based on a determination that the number of icons is the threshold number;

adding the icon corresponding to the application in the application list after deleting the icon corresponding to the other application;

displaying a user interface (UI) comprising the application list and icons in the application list, wherein the icons include logos of applications to which the application is added; and in response to detecting an input on the icon corresponding to the application, transmitting, to the external device, a signal for instructing to open the application corresponding to the icon on the external device.

12. The method of claim 11, further comprising:
providing an interface to perform at least one of:
providing a navigation of previously browsed applications, or
providing a parental control of the applications.

13. The method of claim 11, wherein the predefined region is a region which remains unchanged for a predetermined time in the screen.

14. An apparatus for controlling an external device, the apparatus comprising:
a communication interface configured to:
receive input for setting a pre-determined length of time, and
receive, from the external device:
broadcast channel metadata corresponding to a broadcast channel displayed for a length of time exceeding the pre-determined length of time on the external device, wherein the broadcast channel metadata includes a logo of the broadcast channel and the logo of the broadcast channel is identified from a predefined region of a screen of the external device, or
application metadata corresponding to an application browsed for the length of time exceeding the pre-determined length of time on the external device, wherein the application metadata includes a logo of the application and the logo of the application is identified from the predefined region of the screen of the external device;

a memory configured to store the received broadcast channel metadata or the application metadata in a database;

at least one processor configured to:
determine whether a number of icons corresponding to at least one of broadcast channels or applications in a content list is a threshold number before adding an icon corresponding to the broadcast channel or the application to the content list,
identify an icon corresponding to another broadcast channel or another application that is unselected for a longest period of time in the content list based on a determination that the number of icons is the threshold number, and
add the icon corresponding to the broadcast channel or the application in the content list after deleting the icon corresponding to the other broadcast channel or the other application; and a display configured to display a user interface (UI) comprising the content list and icons in the content list,
wherein the icons includes logos of at least one of broadcast channels or the applications to which the broadcast channel or the application is added, and
wherein the communication interface is further configured to transmit, to the external device, a signal for instructing to open the application on the external device or a signal for instructing to display the broadcast channel on the external device, in response to detecting an input on the icon corresponding to the broadcast channel or the application.

15. The apparatus of claim 14, wherein the user interface is further configured to provide a navigation of the at least one icon associated with the broadcast channel or the application.

16. The apparatus of claim 14, wherein the predefined region is a region which remains unchanged for a predetermined time in the screen.

* * * * *